April 17, 1928.  V. MARANDA  1,666,860

TOOTH EXTRACTOR

Filed May 17, 1926

INVENTOR
VINCENT MARANDA
BY Fetherstonhaugh & Co
ATTORNEYS

Patented Apr. 17, 1928.

1,666,860

UNITED STATES PATENT OFFICE.

VINCENT MARANDA, OF MONTREAL, QUEBEC, CANADA.

TOOTH EXTRACTOR.

Application filed May 17, 1926. Serial No. 109,777.

This invention relates to new and useful improvements in the method of and apparatus for extracting teeth, and the object of the invention is to provide a simple, safe and efficient method of extracting teeth without injuring the gums, jaw bone or the teeth adjacent the tooth being extracted.

Another object is to provide an apparatus for extracting teeth so that the pull necessary to extract one tooth will be distributed evenly across the adjacent teeth and evenly across the jaw bone.

In my invention I provide a bridge piece adapted to fit over the tops of the teeth of the patient. An aperture is formed in the upper surface of the bridge to expose the tooth to be extracted. The tooth of the patient is clamped between a pair of jaws which pass through the bifurcated ends of a fulcrum block, the feet of which rest on the edges of the aperture in the bridge. The fulcrum block remains stationary and means are provided to slide the clamping jaws so that they will pull the tooth clear of the gums.

In the drawing which illustrates one form of my invention;

Figure 2:
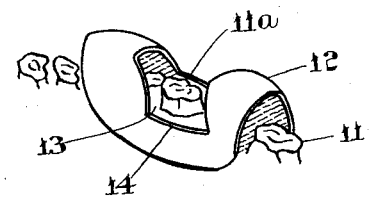
Figure 2 is a perspective view of the bridge in position.
Figures 1, 3, 4:
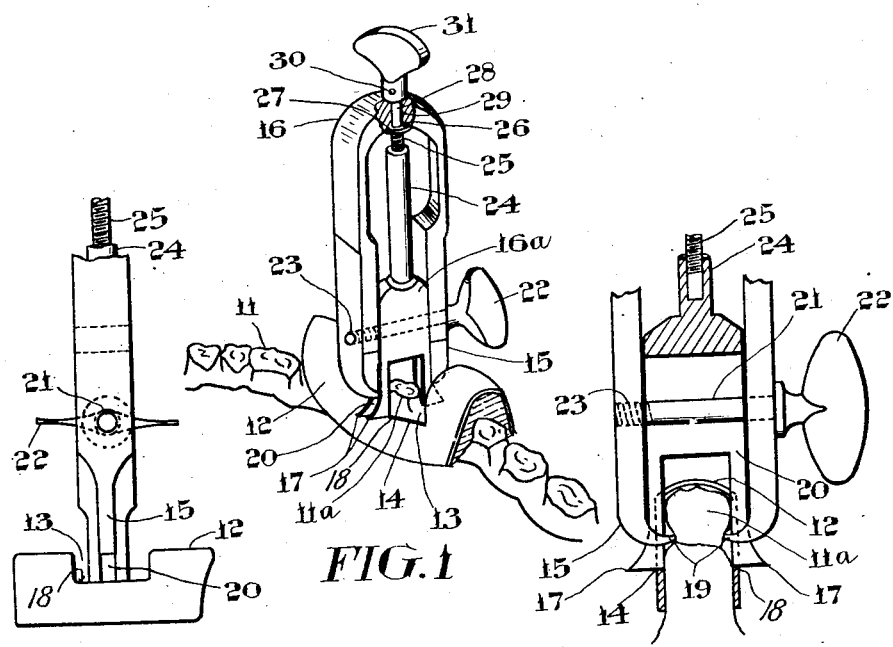
Figure 1 is a perspective view of the apparatus in position for extracting a tooth according to my improved method.
Figure 3 is a side elevation of the lower part of the tooth withdrawing means shown in Figure 1.
Figure 4 is a sectional elevation of the device shown in Figure 3.
Figure 5:
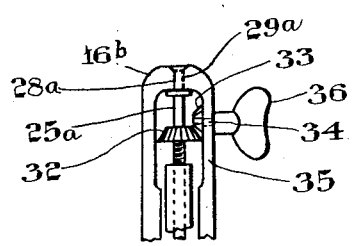
Figure 5 is an elevation of one modification which may be made to move the clamping jaws independently of the block.

Referring more particularly to the drawings, 11 designates the teeth of the lower jaw of a patient and 11ª the tooth to be extracted. A bridge 12 preferably curved to suit the shape of the jaw is provided with a centrally disposed aperture 13, the edges 14 of which are preferably positioned slightly below the point where the tooth projects beyond the gum. The bridge rests on the tops of the adjacent teeth to the one to be extracted, and the sides of said bridge extend downwardly towards the bottom of the mouth and on each side of the teeth, so that when the bridge is placed in position there will be practically no movement of the bridge in the mouth. A pair of clamping jaws 15 are provided and are joined at their upper ends by a piece 16 of such thickness that the jaws may spread away from one another by the resilience of the metal forming such point. The joining piece 16 may be made integral with the clamping jaws. Slidably mounted between the jaws is the fulcrum block 16ª, said block being provided with a pair of feet 17 depending from its underside. The legs are so spaced that they pass on each side of the tooth and rest on the uppermost edges 18 of the bridge in proximity to the aperture formed therein. The lowermost tapering inwardly turned ends 19 of the clamping jaws pass through slots 20 formed in the legs of the fulcrum block, said slots being open at one end and extending upwardly into the block a distance of sufficient length to allow the jaws to pull a tooth partially or wholly from the gum. The jaws are operated by means of a threaded bolt 21 having a head 22 preferably but not necessarily of wing form. The bolt passes through one of the jaws through the fulcrum block and engages with a threaded aperture 23 formed in the other jaw. By moving the bolt 21 in one direction the jaws may be moved towards one another to clamp between the ends 19, the tooth 11ª. Extending upwardly from the upper surface of the fulcrum block and secured thereto is the threaded sleeve 24 which is adapted to receive a threaded spindle 25, the upper end of which is reduced to form a shoulder 26 between which and the piece 16 a washer 27 is placed. The reduced portion 28 passes through an aperture 29, formed in the portion 16, and secured to the end of said portion 28 by means of the cotter pin 30, is the operating handle 31 which is preferably of winged form, as shown in Figure 1. The foregoing description relates to the type of tooth withdrawing means which may be used for drawing front teeth or teeth where the operator has an opportunity of moving the nut or handle 31, but this may be modified to the construction shown in Figure 5 where back teeth have to be removed.

In the modified form the piece 16ᵃ is provided with an aperture 29ᵃ to receive the reduced end 28ᵃ of the spindle 25ᵃ. The aperture 29ᵃ may be countersunk and the end of the spindle 25ᵃ may be riveted over to fill said countersunk aperture and prevent the longitudinal movement of the spindle from interfering with its rotating movement. Secured to the upper end of the spindle 25ᵃ is the bevelled toothed wheel 32 which engages with a bevelled toothed pinion 33 secured to a spindle 34 passing through the side 35 of the clamping jaw joining piece 16ᵇ. A winged handle 36 may be secured to the end of the spindle 34 by any suitable means.

In operation the bridge which is curved to suit the curve of the jaw of the patient, is placed within the mouth of the patient with the aperture exposing the tooth to be extracted. Part of the bridge rests on the teeth on each side of the tooth 11ᵃ, and the sides of the bridge extend over the back and front of the teeth and partly over the gums. The clamping jaws of the extractor are then opened and placed on each side of the tooth 11ᵃ, and by turning the screw or bolt the tooth is firmly gripped between the inwardly turned lowermost end of the jaws, which are slidably connected to the fulcrum block, which is so slotted that it will allow the clamping bolt to move towards the top of the block. The feet of the clamping jaws are resting on the metal surrounding the aperture. In the device shown in Figure 1, the handle is turned and the threaded spindle tends to move the jaws away from the gums of the patient drawing with them the tooth 11ᵃ. In the device shown in Figure 5 bevel gearing is used to turn the threaded spindle and to reduce the length of the device so that it may be used for back teeth. It will be seen that the pressure exerted by the device to pull the tooth is evenly distributed over the adjacent teeth and locally across the jaw bone, a much desired effect which cannot be obtained in the old method where the ordinary hand operated pinchers are used and the load taken on the fulcrum of the jaws, a more or less precarious method as there is always the tendency that the force applied at a distance from the fulcrum of the jaws tends to strain or even break same. In the old method just mentiond, the dentist or operator usually has to twist the tooth to loosen same, a condition which tends to lacerate the gums, whereas in the method herein described the pull on the tooth is perpendicular to the gum and no twisting is necessary to loosen the tooth.

The device is simple in construction and provides a simple apparatus for extracting teeth in a safe and efficient manner and without injuring the gums, jaw bone or the teeth adjacent to the tooth to be extracted. The pull on the tooth is distributed evenly and locally across the jaw bone adjacent to the tooth 11ᵃ thereby reducing the tendency to injure said bone to a minimum.

In pulling teeth at the side of the mouth of the patient an extractor having jaws 15 of different lengths and curvatures may be employed so that said extractor will clear the lips of the patient when the said jaws are clamped to the tooth to be extracted.

Having thus described my invention, what I claim is:—

1. In a device of the character described the combination of a bridge member adapted to rest upon the teeth and provided with an aperture for exposing a tooth to be extracted, and a separate tooth gripping and extracting device having a part adapted to straddle the tooth to be extracted and to engage opposite edges of the aperture formed in the bridge member, said part being connected to the tooth gripping means in such manner as to receive the reactive thrust incident to extraction of the tooth and serving in cooperation with the bridge member to distribute said thrust over a considerable area of the jaw bone in the vicinity of the tooth to be extracted.

2. In a device of the character described the combination of a substantially U-shaped bridge member adapted to fit over a plurality of teeth and provided with an intermediate opening adapted to be positioned directly over a tooth to be extracted, a member provided with a bifurcated portion adapted to straddle the tooth to be extracted and to rest upon the bridge member at opposite edges of said opening, tooth gripping and pulling jaws slidably carried by said bifurcated member and operable into gripping engagement with the tooth straddled by said member, a connection between the bifurcated member and the tooth gripping and pulling jaws operable to force the tooth gripping and extracting jaws outwardly in line with the tooth gripped thereby, said bifurcated member and bridge member serving to receive the reactive thrust incident to the extraction of the tooth and to distribute said thrust over a considerable area of the jaw bone in the vicinity of the tooth being extracted.

3. The combination with an apertured bridge member of the character described of a tooth extracting and gripping member comprising an element bifurcated at one end to straddle the tooth to be extracted and to engage opposite edges of the aperture formed in the bridge member, jaws slidably carried by said element and provided with gripping portions protruding inwardly through slots formed in the branches in the said bifurcated portion of the element so as to grip the tooth straddled by the element, means for securing said jaws in gripping engagement with the tooth and a connection between said element and jaws operable to force the jaws outwardly along said element to exert a pull on the tooth to be extracted.

In witness whereof I have hereunto set my hand.

VINCENT MARANDA.